(12) United States Patent
Campbell

(10) Patent No.: US 9,583,933 B1
(45) Date of Patent: Feb. 28, 2017

(54) MINERAL INSULATED CABLE TERMINATIONS

(71) Applicant: ITT Manufacturing Enterprises LLC, Wilmington, DE (US)

(72) Inventor: Charles Owen Campbell, Santa Rosa, CA (US)

(73) Assignee: ITT MANUFACTURING ENTERPRISES LLC, Wilmington, DE (US)

(*) Notice: Subject to any disclaimer, the term of this patent is extended or adjusted under 35 U.S.C. 154(b) by 0 days.

(21) Appl. No.: 14/973,192

(22) Filed: Dec. 17, 2015

(51) Int. Cl.
H02G 15/04 (2006.01)
H01R 4/18 (2006.01)
H01R 43/00 (2006.01)

(52) U.S. Cl.
CPC ............ H02G 15/04 (2013.01); H01R 4/18 (2013.01); H01R 43/005 (2013.01)

(58) Field of Classification Search
USPC ...................................................... 174/74 R
See application file for complete search history.

(56) References Cited

U.S. PATENT DOCUMENTS

| | | | | |
|---|---|---|---|---|
| 1,177,392 A * | 3/1916 | Dempster | ............ | H02G 15/013 174/77 R |
| 3,364,303 A * | 1/1968 | Zaleski | ............ | H01R 4/58 174/76 |
| 3,763,460 A * | 10/1973 | Hatschek | ............ | H01R 13/533 439/277 |
| 4,015,329 A * | 4/1977 | Hutchison | ............ | H02G 3/088 174/667 |
| 5,917,150 A * | 6/1999 | Hampton | ............ | H02G 15/04 174/152 GM |
| 8,367,944 B2 * | 2/2013 | Chiou | ............ | H02G 3/0691 174/480 |
| 8,708,737 B2 | 4/2014 | Chawgo et al. | | |
| 2004/0089463 A1 * | 5/2004 | Nguyen | ............ | H01R 9/0503 174/21 JC |
| 2012/0138361 A1 * | 6/2012 | Elliott | ............ | H01R 9/05 174/74 R |

FOREIGN PATENT DOCUMENTS

| | | |
|---|---|---|
| CN | 102709864 A | 10/2012 |
| GB | 958197 | 5/1954 |
| GB | 956415 | 4/1964 |
| GB | 1140740 | 1/1969 |
| GB | 1235848 | 6/1971 |
| GB | 1265079 | 3/1972 |

* cited by examiner

Primary Examiner — Timothy Thompson
Assistant Examiner — Michael F McAllister
(74) Attorney, Agent, or Firm — Knobbe, Martens, Olson & Bear LLP

(57) ABSTRACT

Various cable termination assemblies are disclosed. The cable termination assembly can include a pin, a sealing element, a compression plate, and an insulator. The compression plate and the sealing element can be seated on the pin and form a substantially gas or liquid-tight seal with the pin. The insulator can have a feature that engages with a feature on the pin. The insulator can be advanced along the pin to compress the compression plate against the sealing element.

15 Claims, 7 Drawing Sheets

MINERAL INSULATED CABLE TERMINATIONS

BACKGROUND

Field

The present disclosure relates to methods and devices related to an improved termination fitting for a mineral-insulated cable.

Description of Certain Related Art

Mineral-insulated (MI) cables are electrical cables with an inner conductor element, outer metal sheath, and a mineral insulation filling the space between the conductor and the sheath. MI cables are able to withstand physically demanding settings, such as corrosive and/or high temperature environments that may be encountered in certain energy extraction operations. For example, some MI cables are used to heat bitumen or heavy oil in thermally assisted gravity driven operations.

SUMMARY

In terminating an MI cable, an end of the cable is typically cut to allow the application of a termination unit, which can be used to electrically connect the conductor of the MI cable to other electrical components. This cutting process can expose the mineral insulation to the ambient environment. However, because the mineral insulation can be a hygroscopic material (e.g., powdered magnesium oxide or aluminum oxide), such exposure to the ambient environment can result in the mineral insulation absorbing moisture, such as from the surrounding air. This absorption of moisture can degrade operation of the insulation and the cable. For example, moisture can reduce the insulator's dielectric strength and reliability.

In some instances, after the MI cable is cut and prepared for termination, heat is applied to evaporate moisture out of the insulation. A termination can then be installed onto the cable. However, this process typically involves allowing the cable to cool before the termination is applied. For example, in some instances, a mold is placed on the MI cable housing and a potting material is cast around the MI cable. This potting material is usually a form of epoxy that requires much cooler cure temperatures than the temperature used to drive moisture out of the insulator. Allowing the MI cable to cool to apply the potting allows the mineral insulator (e.g., magnesium oxide) to re-absorb moisture, which can degrade its operation. Moreover, such a process can be cumbersome and time-consuming. For example, the process can require about a 24-hour cure time.

Another termination method is to engage a coupling with the radial surface of the outer sheath of the MI cable and use radial compression to form a seal. However, this increases the outer diameter of the MI cable, which can be undesirable for applications in which space is at a premium, such as in wells and other downhole applications. Furthermore, such an implementation can damage the integrity of the outer sheath of the MI cable, which can increase the chance of failure (e.g., breakage).

As discussed in more detail below, some embodiments of this disclosure relate to cable termination assemblies adapted to engage (e.g., compress against) a terminal end of an MI cable. The assemblies can be configured to form a gas or liquid tight seal at the terminal end of a cable when the assembly is fixed to the cable. In certain embodiments, the assemblies can be affixed to the cable while the cable is hot. The assemblies and methods can be configured to form a gas or liquid tight seal at the terminal end of the MI cable without substantially expanding the profile (e.g., outer diameter) of the MI cable. For example, in some embodiments, the assembly does not increase the outside diameter of the MI cable. Various embodiments of the cable termination assemblies can be installed on the MI cable substantially immediately after the MI cable drying process (e.g., heating). The assemblies can be rapidly installed on the MI cable, such as in less than or equal to about 60 seconds.

BRIEF DESCRIPTION OF THE DRAWINGS

Various embodiments are depicted in the accompanying drawings for illustrative purposes, and should not be interpreted as limiting the scope of the embodiments. Furthermore, any features, structures, components, materials, and/or steps of different disclosed embodiments can be combined to form additional embodiments, which are part of this disclosure.

DETAILED DESCRIPTION

Figure 1:
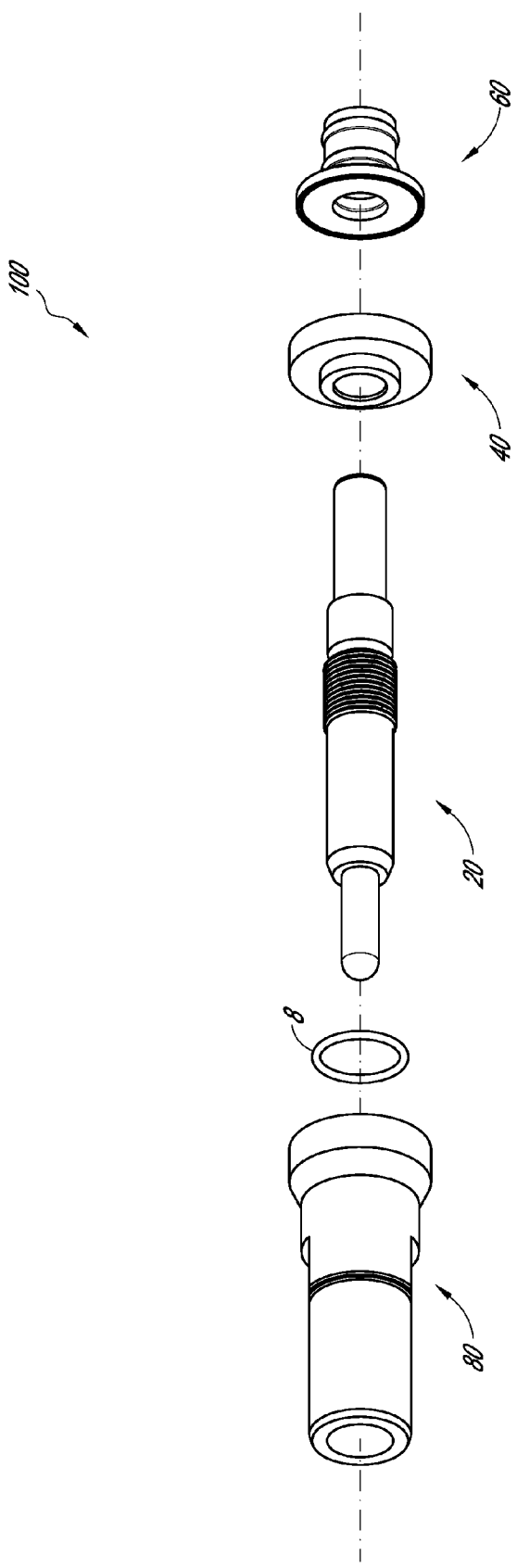
FIG. 1 is an exploded view of one embodiment of a cable termination assembly.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. The aspects of the present disclosure, as generally described herein, and illustrated in the figures, may be arranged, substituted, combined, and designed in a wide variety of different configurations, all of which are explicitly contemplated and made a part of this disclosure.

Overview

FIG. 1 depicts an illustrative, non-limiting example of a cable termination assembly 100. The cable termination assembly 100 can be made up of a collection of components. Some or all of the components may be pre-assembled with one another, as discussed in more detail below. In some embodiments, the cable termination assembly 100 includes a pin 20, compression plate 40, sealing element 60, and insulator 80. As shown, the cable termination assembly 100 can include one or more resilient seals (such as O-rings 8) that are interposed between certain components of the cable termination assembly 100. For example, the O-rings 8 can sealingly engage between the compression plate 40 and the insulator 80. The cable termination assembly 100 may include one or more axially-symmetric components, but the cable termination assembly 100 need not be limited to axisymmetric components.

Figure 2:
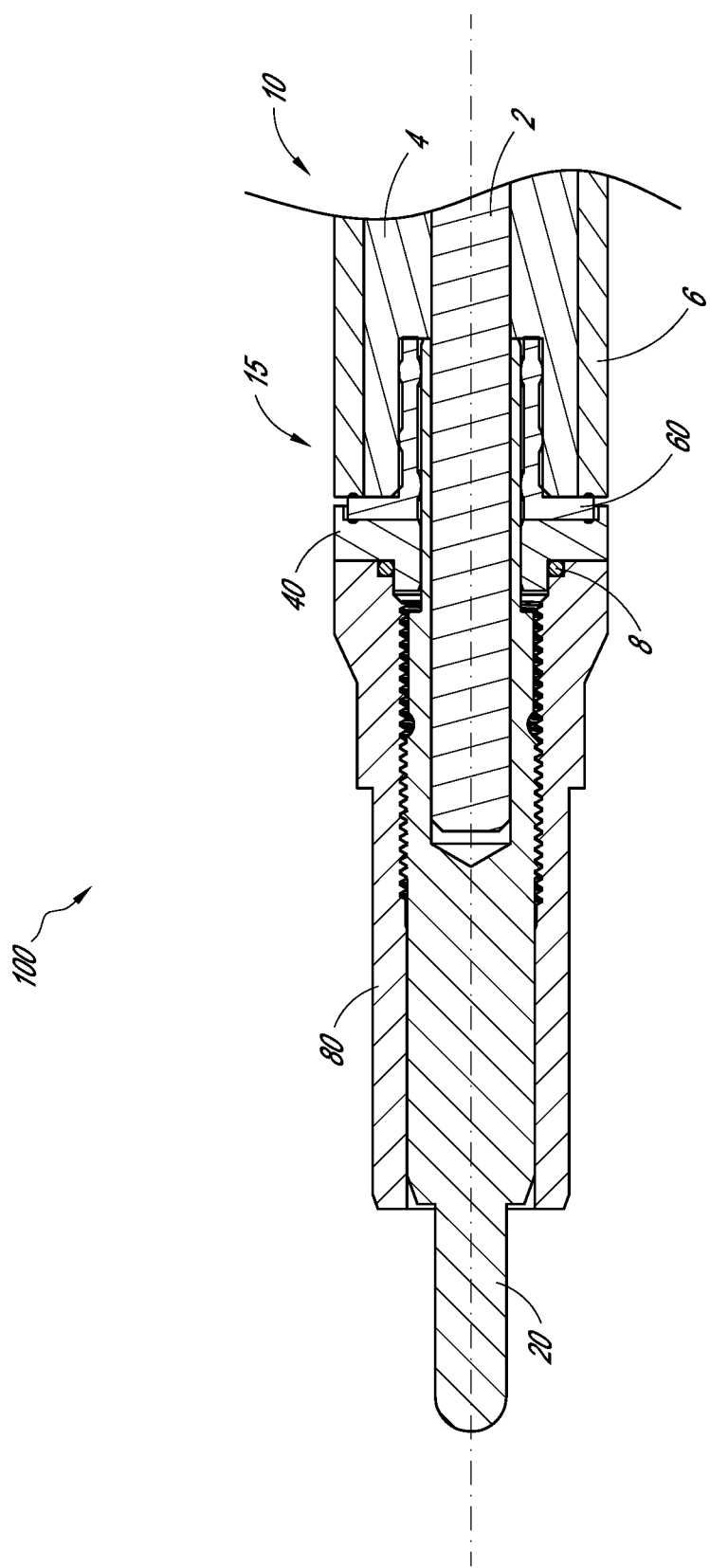
FIG. 2 is a cross-sectional view of the cable termination assembly of FIG. 1 mounted onto a terminal end of an MI cable.

The cable termination assembly 100 can be designed to connect with and/or exert a force on a second structure (e.g., a terminal end of a cable or conduit). For example, FIG. 2 shows an embodiment of the cable termination assembly 100 adapted to press against a terminal end 15 of an MI cable 10. In some embodiments, the cable termination assembly 100 can exert a compression force against a sheath 6 of an MI cable 10, thereby forming a gas or liquid tight seal that inhibits or prevents moisture from accessing the mineral insulator 4 housed within the sheath 6 of the MI cable 10. As discussed in more detail below, the cable termination assembly 100 can be adapted to compress against an MI cable 10 that has been prepared to receive the cable termination assembly 100. As shown, the cable termination assembly 100 can engage with a conductor 2 of the MI cable 10 such that electric current can pass from the conductor 2 to the pin 20.

Pin

Figure 3:
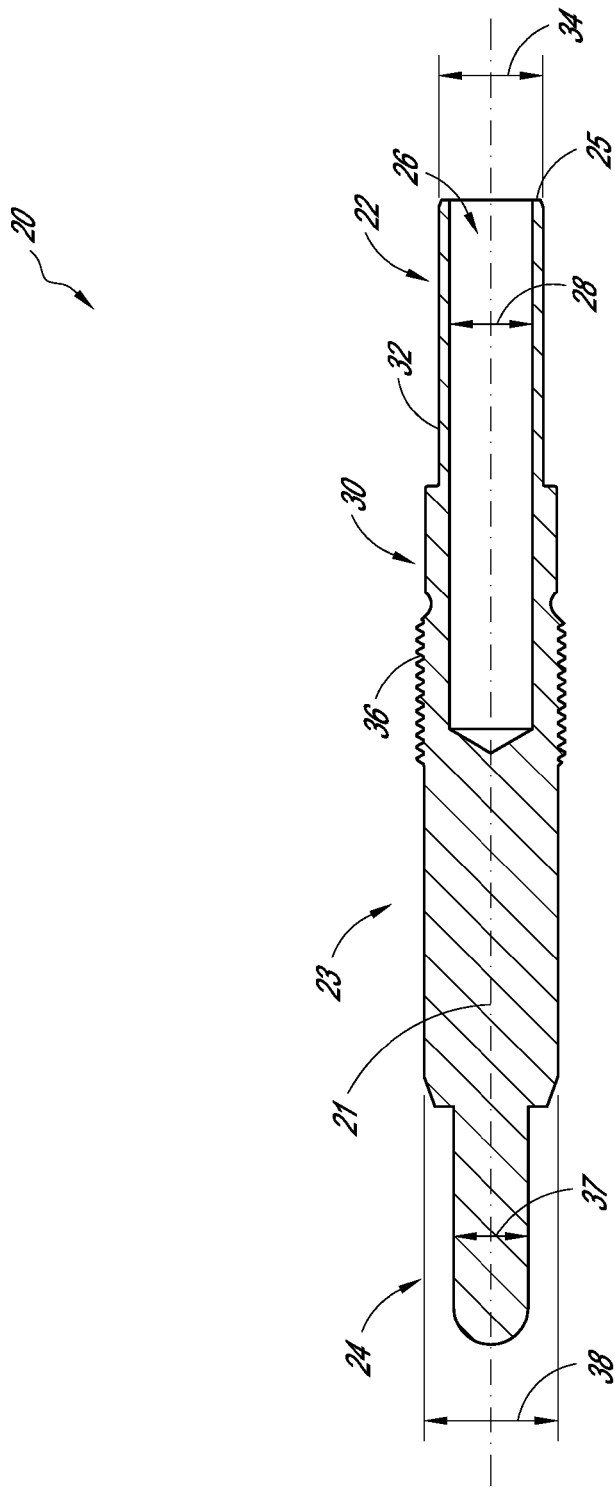
FIG. 3 is a cross-sectional view of a pin component of a cable termination assembly of FIG. 2.

FIG. 3 depicts a cross-sectional view of a non-limiting, illustrative embodiment of the pin 20 component of the cable termination assembly 100. The pin 20 can have a generally elongate shape having a proximal portion 22, a distal portion 24, and an intermediate portion 23 disposed between the proximal and distal portions 22, 24.

The proximal portion 22 may have an outer dimension 34 that is smaller than an outer dimension 38 of the intermediate portion 23. In the illustrated pin 20, the ratio between the outer dimensions of the proximal portion 22 and the intermediate portion 23 is about 0.75. In other embodiments, this ratio is at least about: 0.6, 0.7, 0.8, 0.9, values between the aforementioned values, and otherwise. The distal portion 24 can have an outer dimension 37 that is smaller or larger than the outer dimension 34 of the proximal portion 22. In the illustrated pin 20, the ratio between the outer dimensions of the distal portion 24 and the proximal portion 22 is about 0.8. In other embodiments, this ratio is at least about: 0.6, 0.7, 0.9, 1.0, 1.1, 1.2, values between the aforementioned values, and otherwise. The distal portion 24 can have an outer dimension 37 that is smaller than the outer dimension 38 of the intermediate portion 23. In the illustrated pin 20, the ratio between the outer dimensions of the distal portion 24 and the intermediate portion 23 is about 0.6. In other embodiments, this ratio is at least about: 0.5, 0.55, 0.65, 0.7, values between the aforementioned values, and otherwise. As illustrated, the distal portion 24 may be tapered in the distal direction.

The pin 20 can have a longitudinal axis 21 and may be axisymmetric with respect to the longitudinal axis 21. However, the pin 20 need not be axisymmetric with respect to the longitudinal axis 21. The pin 20 may have a transverse cross-sectional shape that is circular at one or more points along the longitudinal axis 21. The pin 20 may have a transverse cross-sectional shape that is non-circular at one or more points along the longitudinal axis 21. The pin 20 may have a transverse cross-sectional shape that is circular, oval, elliptical, polygonal, or crescent-shaped.

As illustrated, the pin 20 can include at least one proximally-facing cavity 26. The pin 20 may include a cavity 26 that is concentric with the longitudinal axis 21. In some embodiments, the longitudinal axis 21 does not pass through the cavity 26. The pin 20 may include two or more proximally-facing cavities 26. The cavity 26 may be adapted to receive a conductor 2 of a MI cable 10 (see, e.g., FIG. 2). In some embodiments, the cavity 26 is circular and has a diameter 28 that is only slightly larger than the outer diameter of the conductor 2. In some embodiments, the cavity 26 is non-circular and has an effective diameter that is only slightly larger than the effective diameter of the conductor, where the effective diameter is determined by dividing the perimeter of an element (e.g., cavity or conductor) by pi.

In some embodiments, the cavity 26 can be formed by machining into the pin 20 from a proximal surface 25 of the pin 20. The cavity 26 may be open only at the proximal surface 25 of the pin 20. Alternatively, the cavity 26 may open to a lateral surface of the pin 20, thereby taking the form of a longitudinal aperture or groove that runs along at least a portion of a side surface of the pin 20. The cavity 26 may have a transverse cross-sectional shape that is circular, oval, elliptical, polygonal, or crescent-shaped.

The pin 20 can be adapted to couple to a structure (e.g., the conductor 2) that is inserted into the cavity 26. The pin 20 may have a coupling region 30 disposed between the proximal portion 22 and the distal portion 24. The coupling region 30 may overlap with at least a portion of the cavity 26. The pin 20 may be coupled to the structure inserted into the cavity 26 by deforming the coupling region 30, such as by crushing or crimping a portion of the pin 20 within the coupling region 30. The coupling region 30 may have a feature (e.g., a rod, barb, or clamp) that extends at least partially into the cavity 26 and engages at least a portion of the structure that is inserted into the cavity 26. The cavity 26 may contain a material (e.g., adhesive) that bonds to a structure that is inserted into the cavity 26.

The proximal portion 22 of the pin 20 may be adapted to couple the pin 20 to another component of the cable termination assembly 100. For example, the proximal portion 22 may be adapted to couple the pin 20 to the compression plate 40 and/or to the sealing element 60. For example, the outer surface 32 of the proximal portion 22 may be deformable, allowing the compression plate 40 or sealing element 60 to be crimped onto the pin. The proximal portion 22 may have an outer dimension 34 that is slightly larger than an internal passage on the compression plate 40 or sealing element 60, which can cause the compression plate 40 or sealing element 60 to deform when seated onto the proximal portion 22 of the pin 20.

The pin 20 may include an external thread 36 adapted to couple the pin 20 to another component of the cable termination assembly 100 (e.g., insulator 80). The external thread 36 may be disposed on the intermediate portion 23 of the pin 20. The external thread 36 may span all, some, or none of the coupling region 30. As shown, the external thread 36 may longitudinally overlap at least a portion of the cavity 26. In some embodiments, the external thread 36 is longitudinally spaced apart from the cavity 26.

The pin 20 may include a feature that is adapted to engage a tool for tightening components of the cable termination assembly 100 to one another. For example, the outer surface of the distal portion 24 of the pin may have a hexagonal shape, thereby allowing torque to be applied to the pin 20 with a tool that engages the hexagonal-shaped distal portion 24.

Compression Plate

Figure 4:
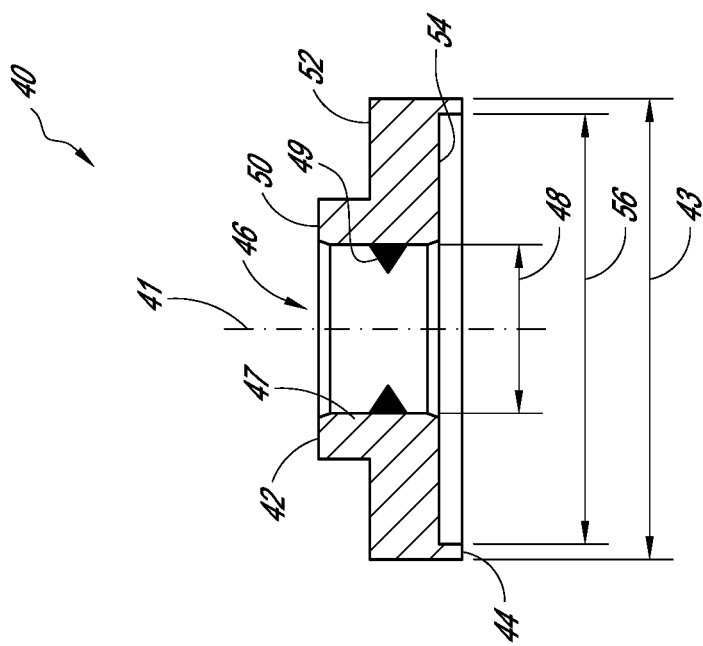
FIG. 4 is a cross-sectional view of a compression plate component of the cable termination assembly of FIG. 2.

FIG. 4 depicts a non-limiting, illustrative embodiment of a compression plate 40. The compression plate 40 can have a distal-facing surface 42 and a proximal-facing surface 44. The compression plate 40 can have an outer dimension 43. The compression plate 40 can have a generally annular shape, with a channel 46 passing through an inner portion of the plate 40. The compression plate 40 may surround the channel 46. Alternatively, the compression plate 40 may only partially surround the channel 46. For example, the plate 40 can have a slot (not shown) along at least a portion of a lateral face of the compression ring. In some embodiments, the slot can run from a distal-most face of the compression plate 40 to a proximal-most face of the compression plate 40, giving the compression plate 40 the shape of a broken ring.

The compression plate 40 can have a longitudinal axis 41 and may be axisymmetric with respect to the longitudinal axis 41. However, the plate 40 need not be axisymmetric with respect to the longitudinal axis 41. The plate 40 may have a transverse cross-sectional shape that is circular at one or more points along the longitudinal axis 41. The plate 40 may have a transverse cross-sectional shape that is non-circular at one or more points along the longitudinal axis 41. The plate 40 may have a transverse cross-sectional shape that is circular, oval, elliptical, polygonal, or crescent-shaped.

The channel 46 can be circular and have a diameter 48 that is sized to accommodate the proximal portion 22 of the pin 20. The channel 46 can be non-circular and have an effective diameter that accommodates the proximal portion 22 of the pin 20, with the effective diameter of the channel 46 being determined by dividing the perimeter of the channel 46 by pi. The channel 46 may have a transverse cross-sectional shape that is circular, oval, elliptical, polygonal, or crescent-shaped.

An inner surface 47 of the compression plate 40 can be adapted to promote coupling of the compression plate 40 with another component of the cable termination assembly 100 (e.g., the pin 20). For example, the inner surface 47 may include a feature (e.g., a protrusion 49) adapted to compress at least a portion of the outer surface of the proximal portion 22 of the pin 20. The inner surface 47 may include an adhesive. The inner surface 47 may comprise a compliant material that allows the channel 46 to expand while forming a sealing fit against a member inserted into the channel 46.

The distal-facing surface 42 of the compression plate 40 can be planar across the outer dimension 43 of the compression plate. In some variants, the distal-facing surface 42 of the compression plate 40 can be tiered. A radially-inward portion 50 of the distal-facing surface 42 may extend distally relative to a radially-outward portion of the distal-facing surface 42, thereby creating a distal-facing seat 52. In certain implementations, a radially-outward portion may extend distally relative to a radially inward-portion of the distal-facing surface 42. The distal-facing surface 42 may include multiple regions that are not co-planar with one another, giving the distal-facing surface 42 a key-like profile when viewed in plane with the longitudinal axis 41, such as shown in FIG. 4.

In some embodiments, the proximal-facing surface 44 of the compression plate 40 can be co-planar across the outer dimension 43 of the compression plate. Alternatively, the proximal-facing surface 44 can be tiered. A radially-outward portion of the proximal-facing surface 44 may extend proximally relative to a radially-inward portion of the proximal-facing surface 44, thereby creating a proximal-facing seat 54. The proximal-facing seat 54 may have a width dimension 56. The radially-inward portion may extend proximally relative to the radially outward-portion of the proximal-facing surface 44. The proximal-facing surface 44 may include multiple regions that are not co-planar with one another, giving the proximal-facing surface 44 a key-like profile when viewed in plane with the longitudinal axis 41, such as shown in FIG. 4.

Sealing Element

Figure 5:
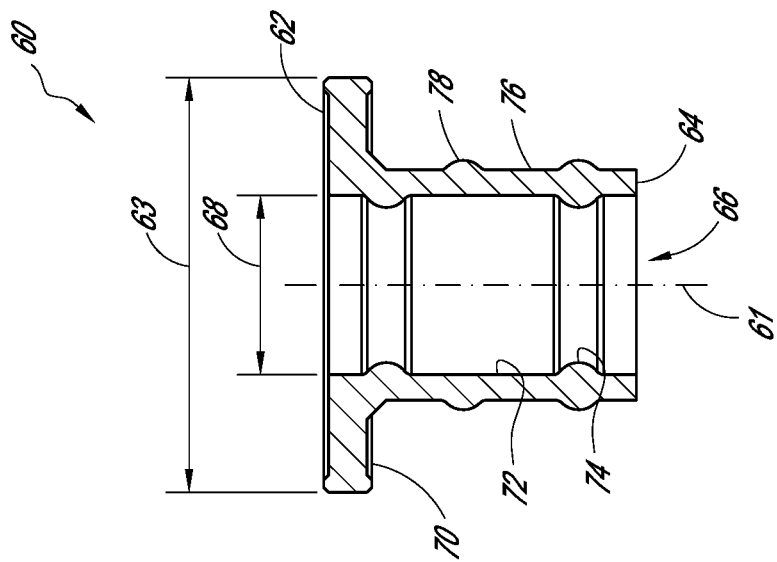
FIG. 5 is a cross-sectional view of a sealing element component of the cable termination assembly of FIG. 2.

FIG. 5 depicts a non-limiting, illustrative embodiment of a sealing element 60. The sealing element 60 can have a distal-facing surface 62 and a proximal-facing surface 64. The sealing element 60 can have an outer dimension 63. The sealing element 60 can have a generally annular shape, with a channel 66 passing through an inner portion of the sealing element 60. The sealing element 60 may surround the channel 66, or may only partially surround the channel 66.

The sealing element 60 can have a longitudinal axis 61 and may be axisymmetric with respect to the longitudinal axis 61. However, the sealing element 60 need not be axisymmetric with respect to the longitudinal axis 61. The sealing element 60 may have a transverse cross-sectional shape that is circular at one or more points along the longitudinal axis 61. The sealing element 60 may have a transverse cross-sectional shape that is non-circular at one or more points along the longitudinal axis 61. The sealing element 60 may have a transverse cross-sectional shape that is circular, oval, elliptical, polygonal, or crescent-shaped.

The channel 66 of the sealing element 60 can be circular and have a diameter 68 that is sized to accommodate the proximal portion 22 of the pin 20. The channel 66 can be non-circular and have an effective diameter that accommodates the proximal portion 22 of the pin 20, with the effective diameter of the channel 66 being determined by dividing the perimeter of the channel 66 by pi. The channel 66 may have a transverse cross-sectional shape that is circular, oval, elliptical, polygonal, or crescent-shaped.

The distal-facing surface 62 of the sealing element 60 can be planar across the entire outer dimension 63 of the sealing element 60. In some embodiments, the distal-facing surface 62 can be tiered. A radially-inward portion of the distal-facing surface 62 may extend distally relative to a radially-outward portion of the distal-facing surface 62. The radially-outward portion may extend distally relative to the radially inward-portion of the distal-facing surface 62. As shown in FIG. 5, the distal-facing surface 62 may include multiple regions that are not co-planar with one another, giving the distal-facing surface 62 a key-like profile when viewed in plane with the longitudinal axis 61.

In some embodiments, the proximal-facing surface 64 of the sealing element 60 can be planar across the entire outer dimension 63 of the sealing element 60. In some embodiments, the proximal-facing surface 64 can be tiered. The radially-inward portion of the proximal-facing surface 64 may extend proximally relative to the radially-outward portion of the proximal-facing surface 64, thereby creating a proximal-facing seat 70. A radially-outward portion may extend proximally relative to a radially inward-portion of the proximal-facing surface 64. The proximal-facing surface 64 may include multiple regions that are not co-planar with one another, giving the proximal-facing surface 64 a key-like profile when viewed in plane with the longitudinal axis 61, as shown in FIG. 5.

The sealing element 60 may include features that help the sealing element 60 interlock with other structures. For example, an inner surface 72 of the channel 66 may include a protrusion (e.g., a ridge 74) that engages the outer surface 32 of the proximal portion 22 of the pin 20. The outer surface 76 of the sealing element 60 may include one or more protrusions (e.g., ribs 78) that engage a surrounding structure (e.g., mineral insulation in the MI cable). The inner surface 72 may include a feature (e.g., a rod, barb, or clamp) that extends at least partially into the channel 66 and engages at least a portion of the structure that is inserted into the channel 66. The channel 66 may contain a material (e.g., adhesive) that bonds to a structure that is inserted into the channel 66.

Insulator

Figure 6:
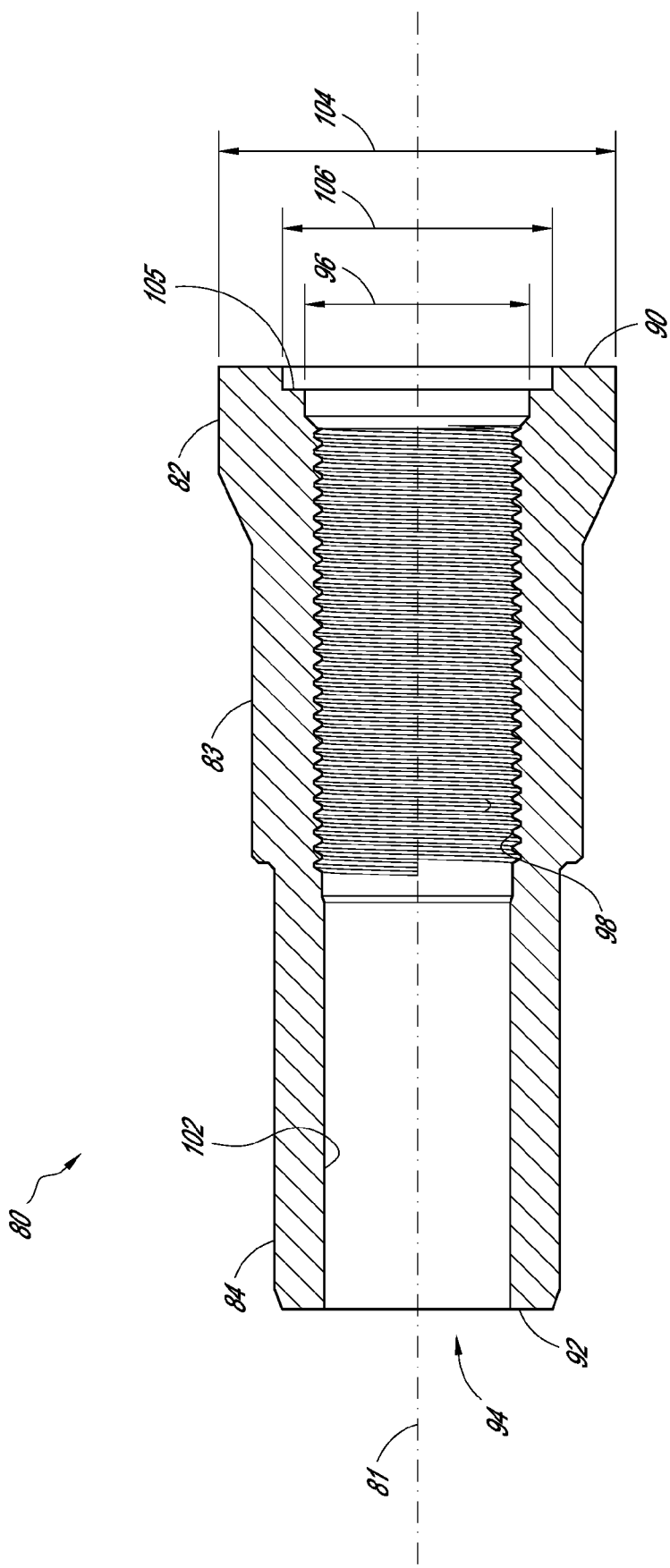
FIG. 6 is a cross-sectional view of an insulator component of the cable termination assembly of FIG. 2.

FIG. 6 depicts a non-limiting, illustrative embodiment of an insulator 80. The insulator 80 can have a generally elongate shape having a proximal portion 82, a distal portion 84, and an intermediate portion 83 disposed between the proximal and distal portions 82, 84. The proximal portion 82 may have an outer dimension 86 that is larger than an outer dimension the intermediate portion 83. As shown in FIG. 6, the distal portion 84 may be tapered in the distal direction.

The insulator 80 can have a longitudinal axis 81 and may be axisymmetric with respect to the longitudinal axis 81. However, the insulator 80 need not be axisymmetric with respect to the longitudinal axis 81. The insulator 80 may have a transverse cross-sectional shape that is circular at one or more points along the longitudinal axis 81. The insulator 80 may have a transverse cross-sectional shape that is non-circular at one or more points along the longitudinal axis 81. The insulator 80 may have a transverse cross-sectional shape that is circular, oval, elliptical, polygonal, or crescent-shaped.

The insulator 80 can have a proximal-facing surface 90, a distal-facing surface 92. The insulator 80 can have an opening 94 communicating between the proximal-facing and distal-facing surfaces 90, 92. The opening 94 can be circular and have a diameter 96 that is sized to accommodate the distal portion 24 of the pin 20. The opening 94 can be non-circular and have an effective diameter that accommodates the distal portion 24 of the pin 20, with the effective diameter of the opening 94 being determined by dividing the perimeter of the opening 94 by pi. The opening 94 may have a transverse cross-sectional shape that is circular, oval, elliptical, polygonal, or crescent-shaped.

The insulator 80 may include at least one feature adapted to help the insulator 80 couple with another component of the cable termination assembly 100 (e.g., the pin 20, compression plate 40, and/or sealing element 60). For example, the insulator 80 may have an internal thread 98 disposed on at least a portion of a lateral surface 102 of the opening 94. The internal thread 98 may be adapted to mate with an external thread 36 disposed on the outer surface of the pin 20. The internal thread 98 of the insulator 80 may span the entire longitudinal length of the insulator 80. In some embodiments, the internal thread 98 may span only a portion of the longitudinal length of the insulator 80. The internal thread 98 may partially or completely circumferentially surround the longitudinal axis 81.

In some embodiments, the proximal-facing surface 90 of the insulator 80 can be co-planar across the outer dimension 104 of the proximal-facing surface 90. In certain variants, the proximal-facing surface 90 can be tiered. A radially-outward portion of the proximal-facing surface 90 may extend distally relative to a radially-inward portion of the proximal-facing surface 90, thereby creating a proximal-facing seat 105. The proximal-facing seat 105 can have an outer dimension 106 that accommodates another component of the cable termination assembly 100 (e.g., the compression plate 40, and/or sealing element 60).

As illustrated, a radially-inward portion of the proximal-facing surface 90 may extend proximally relative to a radially outward-portion of the proximal-facing surface 90. The proximal-facing surface 90 may include multiple regions that are not co-planar with one another, giving the proximal-facing surface 90 a key-like profile when viewed in plane with the longitudinal axis 81.

The insulator 80 may include a feature that is adapted to engage a tool for tightening components of the cable termination assembly 100 to one another. For example, the outer surface of the intermediate portion 83 may be configured to have a hexagonal shape, thereby allowing a torque to be applied to the insulator with a wrench that engages the hexagonal-shaped intermediate portion 83.

Assembling the Cable Termination Assembly

Referring back to FIG. 2, the cable termination assembly 100 is illustrated in an assembled state in which the assembly 100 is engaged with the end of an MI cable 10. As previously mentioned, the cable termination assembly 100 can be applied to the MI cable 10. The MI cable 10 can be prepared to receive the cable termination assembly 100. The MI cable 10 may be prepared to receive the assembly before, after, or during assembly of some or all of the components of the cable termination assembly 100.

The terminal end 15 of an MI cable 10 may be prepared by removing a distal portion of the sheath 6 while leaving the conductor 2 intact. A distal portion of the sheath 6 can be cut away using a tool such as a pipe cutter, thereby leaving the conductor 2 intact. After cutting away the sheath 6, a terminal portion of the conductor 2 can extend distally beyond the cut end of the sheath 6. The mineral insulator 4 can be removed from around the portion of the conductor 2 that extends beyond the sheath 6.

The cable termination assembly 100 can comprise two or more components selected from the group consisting of the pin 20, the compression plate 40, the sealing element 60, and the insulator 80 can be assembled together to form a cable termination assembly 100. In some embodiments, the cable termination assembly 100 may lack one or more of the aforementioned components. For example, the cable termination assembly 100 may lack the compression plate 40.

As shown in FIG. 2, the compression plate 40, the sealing element 60, and the insulator 80 may be engaged with the pin 20. For example, the compression plate 40 and the sealing element 60 may be positioned over the proximal portion of the pin 20. The insulator 80 can engage the distal portion of the pin 20. The compression plate 40 can be disposed longitudinally between the insulator 80 and the sealing element 60. The compression plate 40 and/or the sealing element 60 may be configured to form a liquid-tight seal with the pin 20. In some embodiments, the compression plate 40 and/or the sealing element 60 can be configured to maintain a liquid-tight seal with the pin 20 as the compression plate 40 and/or the sealing element 60 move longitudinally along the proximal portion of the pin 20.

The portion of the pin 20 that is engaged with the insulator 80 can have a larger outer dimension compared with the portion of the pin 20 that is surrounded by the compression plate 40 and the sealing element 60, as depicted in FIG. 2. At least a portion of the inner surface of the insulator 80 can be configured to engage at least a portion of the outer surface of the pin 20, such as, for example, by a mating thread, as shown in FIG. 2. This can result in the insulator 80 advancing proximally relative to the pin 20. In some embodiments, the insulator 80 engages the pin 20 with ratcheted teeth that are configured to allow the insulator 80 to be advanced relative to the pin 20 only in the proximal direction. In certain variants, at least a portion of the pin 20 may extend distally beyond the insulator 80.

The insulator 80 can be configured to engage (e.g., compress against) the compression plate 40 as the insulator 80 is advanced along the pin 20 in the proximal direction. In some embodiments, the insulator 80 can be configured to engage (e.g., compress directly against) the sealing element 60 as the insulator 80 is advanced along the pin 20 in the proximal direction.

In some embodiments, in assembling the cable termination assembly, the proximal portion 22 of the pin 20 can be passed through the channel 46 of the compression plate 40. In some embodiments, an O-ring 8 may be placed on a distal-facing surface of the compression plate 40 before the plate 40 is placed onto the proximal portion 22 of the pin 20. The placement of the O-ring 8 on the compression plate 40 may be adapted to create a seal between the compression plate 40 and the insulator 80.

The inner surface 47 of the compression plate 40 can include the protrusion 49 or other feature (as discussed above) that allows the compression plate 40 to form a sealing fit with the outer surface 32 of the proximal portion 22 of the pin 20. In some embodiments, the compression plate 40 may be crimped or otherwise secured to the pin 20 after being seated onto the proximal portion 22 of the pin 20.

In certain implementations, the proximal portion 22 of the pin 20 can be passed through the channel 66 of the sealing element 60. The inner surface 72 of the sealing element 60 can include the ridge 74 or other feature (as discussed above) that allows the sealing element 60 to form a sealing fit with the proximal portion 22 of the pin 20. In some embodiments, the sealing element 60 may be crimped or otherwise secured to the pin 20 after being seated onto the proximal portion 22 of the pin 20.

In some embodiments, the pin 20 can receive some or all of the portion of the conductor 2 that extends beyond the cut sheath 6 of the MI cable 10. For example, the conductor 2 can be advanced into the cavity 26 of the pin 20. In some variants, the conductor 2 can be advanced into the cavity 26 until the conductor 2 is within a portion of the cavity 26 that is longitudinally overlapped by the coupling region 30 (shown in FIG. 3). The coupling region 30 may be crimped or otherwise secured (e.g., adhered, welded, etc.) to firmly attach the pin 20 to the conductor 2. The connection between the conductor 2 and the pin 20 can be such that the conductor 2 and pin 20 are in electrical communication. In various embodiments, the pin 20 can provide a mechanism to electrically connect the conductor 2 of the MI cable 10 to other electrical components.

With continued reference to FIG. 2, in some embodiments, a portion of the proximal portion 22 of the pin 20 is received inside the MI cable 10. For example, the proximal portion 22 of the pin 20 is can be advanced proximally into the mineral insulator. In some embodiments, a portion of the mineral insulator 4 may be evacuated near the conductor 2 in order to accommodate the proximal portion 22 of the pin 20. In certain implementations, the proximal end of the cable termination assembly 100 may be tapered to allow the pin 20 and sealing element 60 to wedge into the mineral insulator 4.

In certain variants, the distal portion of the pin 20 can be received inside the opening 94 of the insulator 80, such as by the distal portion of the pin 20 can being advanced into the proximal end of the insulator 80. The insulator 80 can be positioned so that the insulator 80 interlocks with the pin 20. For example, the insulator 80 and the pin 20 may have mating threads. The insulator 80 may have an internal thread 98 that engages with an external thread 36 on the pin 20.

For the case of a threaded pin 20 and insulator 80, the insulator 80 can be rotated to advance the insulator 80 along the pin 20. The insulator 80 can advance proximally relative to the pin 20 as the insulator 80 is tightened according to its thread. A proximal-facing surface 90 of the insulator 80 can press against a distal-facing surface 42 of the compression plate. Further advancement of the insulator 80 can force a proximal-facing surface 44 of the compression plate 40 against a distal-facing surface 62 of the sealing element 60. Further advancement of the insulator 80 can force a proximal-facing surface 64 of the sealing element 60 against the cut end of the sheath 6 of the MI cable 10. Thus, the sealing element 60 can be compressed between the axial end of the sheath 6 of the MI cable 10 and the compression plate 40, thereby providing a sealed end of the MI cable 10. In various embodiments, the cable termination assembly 100 can provide a sealed end for the MI cable 10.

As illustrated in FIG. 2, the cable termination assembly 100 can be configured to not, or not substantially, increase the radial size of the MI cable 10. This can aid in passing the terminated MI cable through small spaces, which may not be accessible were the cable termination assembly 100 to increase the radial size of the terminated MI cable. In some embodiments, the maximum outside diameter of the cable termination assembly 100 is less than or equal to the outside diameter of the outer sheath of the MI cable 10. For example, as can be seen in FIG. 2, the maximum outside diameter of the compression plate 40, sealing element 60, and/or insulator 80 can be less than or equal to the outside diameter of the cut end of the MI cable 10.

As shown, the cable termination assembly 100 can be configured to engage the cut axial end of the MI cable 10. In various embodiments, the cable termination assembly 100 does not engage with an outer radial surface of the MI cable 10. In some embodiments, the cable termination assembly 100 does not engage with a component engaged with the outer radial surface of the MI cable 10. For example, in some embodiments, the cable termination assembly 100 is configured to securely connect with and/or terminate the MI cable 10 without the use of a flange or nut that connects with the outer radial surface of the MI cable 10.

In some embodiments, when connected with the MI cable 10, the cable termination assembly 100 applies a force to the MI cable 10 along a direction that is substantially parallel to the longitudinal axis of the MI cable 10. For example, the cable termination assembly 100 can apply a longitudinal tensional force on the conductor 2 and a longitudinal compressive force on the sheath 6. In certain variants, the cable termination assembly 100 does not apply a radial force on the MI cable 10. For example, the cable termination assembly 100 can be configured so as apply no, or substantially no, radially-inwardly directed force to the sheath 6.

In various embodiments, the cable termination assembly 100 is configured to reduce or avoid damage to the sheath 6. For example, some embodiments do not include teeth or cam surfaces that engage (e.g., dig into) a radially outer surface of the sheath 6. In some embodiments, the cable termination assembly 100 is removable from the MI cable 10. For example, the insulator 80 can be unscrewed from the pin 20, and the pin 20 can be longitudinally pulled to remove the conductor 2 from within the pin 20. In some embodiments, removal of the pin 20 also removes the compression plate 40 and/or the sealing element 60. In certain variants, the compression plate 40 and/or the sealing element 60 can be readily longitudinally separated from the MI cable 10 after the pin 20 has been removed. In some embodiments, after removal of the cable termination assembly 100, the radially outer surface of the sheath 6 is substantially undamaged (e.g., does not include gouges or grooves left by the cable termination assembly 100).

Certain Methods Related to the Cable Termination Assembly

Figure 7:
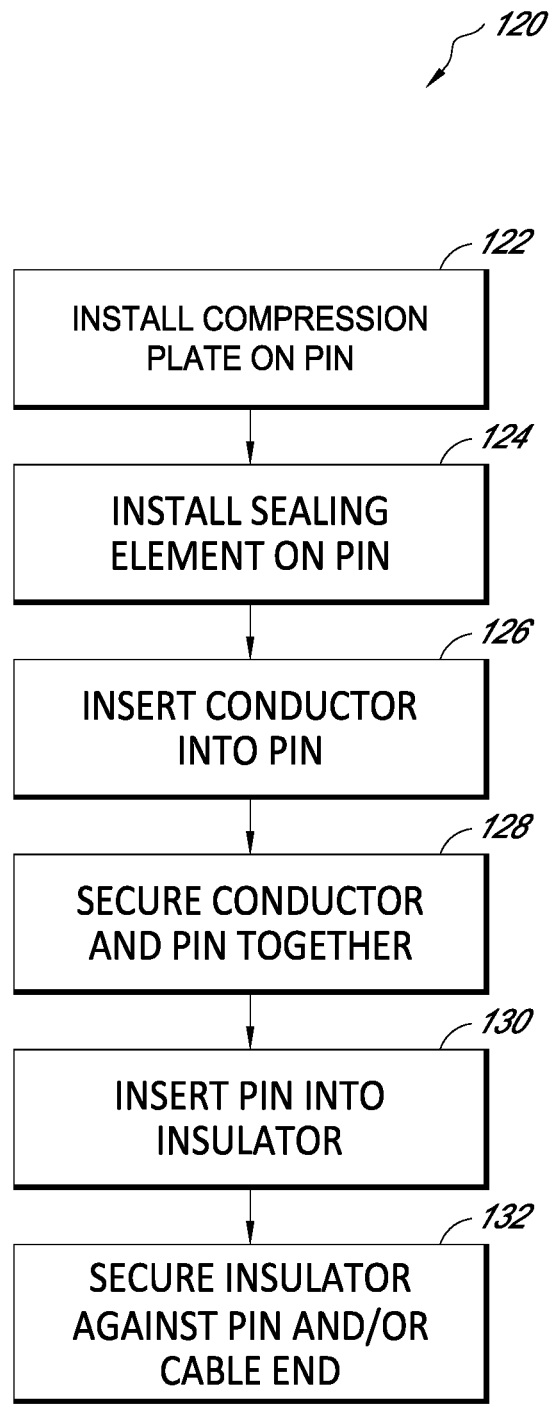
FIG. 7 is a flow diagram of a method of installing a cable termination assembly.

FIG. 7 depicts an illustrative, non-limiting example of a method 120 of terminating a cable, such as a method of terminating an MI cable using the cable termination assembly 100. In some embodiments, the method 120 can include block 122, which involves installing the compression plate 40 on the pin 20. The compression plate 40 can be secured to the proximal portion of the pin 20 by any suitable method (e.g., crimping, friction fit), as described above. The compression plate 40 can be configured to form a liquid-tight or substantially liquid-tight seal with the pin 20.

The method 120 can include block 124, which can comprise installing the sealing element 60 on the pin 20. The sealing element 60 can be secured to the proximal portion of the pin 20 by any suitable means (e.g., crimping, friction fit), as described above. The sealing element 60 can be configured to form a liquid-tight or substantially liquid-tight seal with the pin 20. In some embodiments, the sealing element 60 can be secured to the pin 20 proximal to the compression plate 40.

The method 120 can include block 126, which can include inserting the conductor 2 of the MI cable 10 into the pin 20. The conductor 2 can be inserted into the channel 26 of the pin 20. In some embodiments, the conductor 2 can be inserted into the pin 20 to a depth such that at least a portion of the sealing element 60 contacts the outer sheath 6 of the MI cable 10. In some embodiments, the conductor 2 can be inserted into the channel 26 of the pin 20 to a depth such that a gap remains between the sealing element 60 and the outer sheath 6 of the MI cable 10.

The method 120 can include block 128, which can include electrically connecting the conductor 2 and the pin 20. For example, the method can include securing together the conductor 2 and the pin 20, such as with a physical connection (e.g., a crimp). The conductor 2 and pin 20 can be secured together by any suitable means (e.g., crimping, friction fit, adhesive), as described above.

The method 120 can include block 130, which can involve inserting the pin 20 into the insulator 80, such as into the opening 94. In some embodiments, the pin 20 can be inserted into the insulator 80 to a depth sufficient to allow a securing feature (e.g., external thread) on the pin 20 to engage a securing feature (e.g., internal thread) on the insulator 80.

The method 120 can include block 132, which can comprise securing the insulator 80 against the pin 20 and/or against the end of the MI cable 10. In some embodiments, the insulator 80 can be secured against the pin 20 and/or against the end of the MI cable 10 by applying torque to the insulator 80 so that the insulator 80 is drawn proximally over the pin 20. In certain embodiments, the compression plate 40 and/or the sealing element 60 are configured to move (e.g., slide) relative to the pin 20. For example, the pin 20 can be secured more fixedly to the conductor 2 than the pin 20 is secured to the compression plate 40 and/or the sealing element 60, thereby allowing the insulator 80 to move the compression plate 40 and/or the sealing element 60 in the proximal direction as the insulator 80 is advanced proximally over the pin 20.

Figure 8:
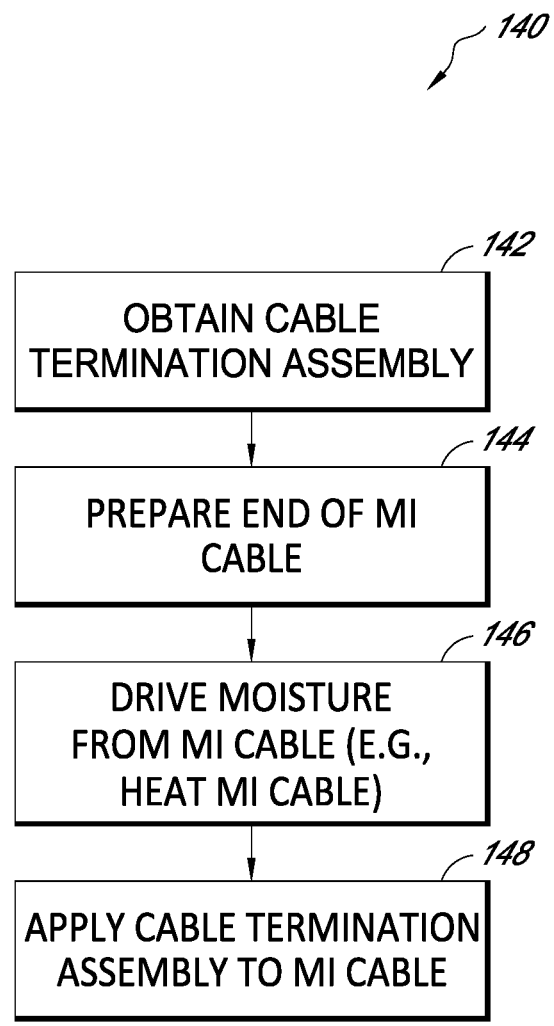
FIG. 8 is a flow diagram of a method of terminating an MI cable.

FIG. 8 depicts an illustrative, non-limiting example of a method 140 of terminating a cable, such as an MI cable. As shown, the method 140 can include block 142, which includes obtaining the cable termination assembly 100. In some embodiments, the cable termination assembly 100 is obtained as a kit, such as a collection of separate components that are configured to be assembled to form the cable termination assembly 100. The method 140 can include block 144, which involves preparing the end of the MI cable 10. This can include, for example, exposing the terminal portion of the conductor 2 by removing a portion of the outer sheath 6 and the mineral insulation 4 that longitudinally overlaps the terminal portion of the conductor 2. The method 140 can include bock 146, which can comprise driving moisture from the MI cable 10. In some embodiments, moisture can be driven from the MI cable 10 by heating the MI cable 10, such as with a torch or other heat source.

The method 140 can include block 148, which can include applying the cable termination assembly 100 to the MI cable 10. In some embodiments, the cable termination assembly 100 can be applied to the MI cable 10 while the MI cable 10 is at an elevated temperature, such as at least about: 80° C., 100° C., 120° C., 150° C., temperatures between the aforementioned temperatures, or other temperatures.

Various methods include applying the cable termination assembly 100 to the MI cable 10 substantially immediately after ceasing to apply heat to the end of the MI cable, such as within less than or equal to about 1 minute. For example, substantially immediately after ceasing to apply heat to the end of the MI cable, the method can include connecting the pin to a conductor of the MI cable, such as by crimping the pin is onto the conductor. The method can include engaging the insulator with the pin, such as by a threaded engagement.

Certain methods include engaging the cut end of the MI cable with the sealing element. For example, the cut end of the MI cable can be sealed by the engagement of a resilient boot with a longitudinal end of the cut end of the MI cable. In certain implementations, the sealing element is compressed against the longitudinal end of the MI cable in response to the insulator being threadably engaged with the pin. In some embodiments, the insulator longitudinally moves the compression plate, which in turn compresses against the sealing element. In certain implementations, the cut end of the MI cable is sealed without the use of a potting compound.

Some methods include rapid installation the cable termination assembly. For example, in certain implementations, the method includes connecting the cable termination assembly to the MI cable in a period of less than about 60 seconds, measured from when the first component of the cable termination assembly is engaged with the MI cable to when the end of the MI cable is sealed and terminated. In various embodiments, the method does not include delaying for a period to allow the MI cable to cool and/or to allow a potting compound to set or cure.

Certain Terminology

Although the cable termination assemblies have been disclosed in the context of certain embodiments and examples, it will be understood by those skilled in the art that the assemblies extend beyond the specifically disclosed embodiments to other alternative embodiments and/or uses of the embodiments and certain modifications and equivalents thereof. For example, although MI cables having one conductor are depicted in some of the figures, the disclosed inventive concepts can be used in connection with a wide variety of MI cable configurations. For example, some embodiments of the pin can have more than one cavity, with each cavity adapted to accommodate a conductor. In this way, the assembly can accommodate two conductors, three conductors, four conductors, or more. Additionally, the insulator may be adapted to accommodate more than one pin, providing another means by which the assembly can accommodate more than one conductor. Moreover, as mentioned above, the description describes, and several figures show, the assembly in the context of sealing an MI cable. However, this is illustrative only and is not intended to be limiting. The assembly can be configured to seal against other cables, conduits, or otherwise. Use with any structure is expressly within the scope of this invention. Various features and aspects of the disclosed embodiments can be combined with or substituted for one another in order to form varying modes of the assembly. For example, the insulator may be configured to press directly against the sealing element, allowing some embodiments of the assembly to exclude a compression plate. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Terms of orientation used herein, such as "top," "bottom," "proximal," "distal," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Some embodiments have been described in connection with the accompanying drawings. The figures are to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

SUMMARY

In summary, various embodiments and examples of assemblies have been disclosed. Although the assemblies have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow.

The following is claimed:

1. A cable termination kit comprising:
   an elongate pin comprising a proximal end, a distal end, and an outer surface, the distal end having a cavity configured to receive a portion of a conductor of a mineral insulated (MI) cable, the outer surface of the pin having a first coupling feature;
   a sealing element comprising a flange that circumferentially surrounds an opening, the opening being configured to receive therethrough the proximal end of the pin, the sealing element being configured to engage with a rigid sheath of the MI cable; and
   an insulator comprising a channel and inner surface, the inner surface having a second coupling feature, the channel configured to receive therethrough the distal end of the pin, the second coupling feature being configured to mate with the first coupling of the pin.

2. The kit of claim 1, further comprising a compression plate comprising a collar that circumferentially surrounds an aperture, the compression plate configured to be positioned longitudinally between the sealing element and the insulator.

3. The kit of claim 1, wherein the sealing element is configured to form a substantially liquid-tight seal with the pin when the pin is inserted into the opening.

4. The kit of claim 1, wherein the first and second coupling features comprise threads.

5. The kit of claim 1, wherein the sealing element further comprises a protrusion on an inner surface of the sealing element, the protrusion being adapted to engage the outer surface of the pin.

6. The kit of claim 1, wherein the pin further comprises a crimp zone longitudinally positioned between the first coupling feature and the distal end of the pin, a portion of the crimp zone configured to compress radially inward to engage with the conductor, thereby securing the conductor in the cavity.

7. The kit of claim 1, wherein the sealing element is configured to form a substantially liquid-tight seal with the pin when the distal end of the pin is received in the opening.

8. The kit of claim 1, wherein the flange has a maximum outside diameter that is less than or equal to an outside diameter of the MI cable.

9. The kit of claim 1, wherein the cable termination is configured so as to not radially compress against an outer surface of the MI cable.

10. The kit of claim 1, wherein the pin is configured to be secured to the conductor of the MI cable.

11. The kit of claim 1, wherein a portion of the pin is configured to radially-inwardly deform onto the MI conductor.

12. The kit of claim 1, wherein a portion of the pin is configured to be inserted into an interior of the MI cable.

13. The kit of claim 1, wherein the insulator and the pin are configured to be threadably engaged.

14. The kit of claim 1, wherein the first coupling feature of the pin and the second coupling feature of the insulator are configured to engage such that the insulator is advanced longitudinally toward the sealing element.

15. The kit of claim 1, wherein the MI cable is configured to be heated to at least 150° C. to drive moisture from the MI cable.

* * * * *